United States Patent [19]
Charbonnier

[11] 3,753,100
[45] Aug. 14, 1973

[54] ACTIVE FREQUENCYMETER
[75] Inventor: Roger Charbonnier, Meudon, France
[73] Assignee: Adret-Electronique, Trappes, France
[22] Filed: July 16, 1971
[21] Appl. No.: 163,154

[30] Foreign Application Priority Data
July 30, 1970 France .................. 7028299

[52] U.S. Cl. ............................ 324/78 D
[51] Int. Cl. ............................ G01r 23/02
[58] Field of Search ............... 324/78 R, 78 D

[56] References Cited
UNITED STATES PATENTS
3,212,024  10/1965  King .................. 324/79 R
3,372,339  3/1968  Harrison et al. ...... 324/79 R
3,644,827  2/1972  Landefeld ............ 324/79 R Primary Examiner—Alfred E. Smith
Attorney—William A. Drucker

[57] ABSTRACT

Device for measuring frequencies, comprising a frequencymeter having a memory and digital outputs which programs an iterative frequency synthesizer. The latter comprises an interpolation oscillator switchable to a plurality of the decade units of the synthesizer. Means are provided for effecting a subtractive mixing of the synthesized frequency and the frequency to be measured and means are provided for controlling the frequency variation of the interpolation oscillator from the output of the mixing means. A second frequencymeter which has digital outputs measures the frequency increment of the interpolation oscillator.

4 Claims, 1 Drawing Figure

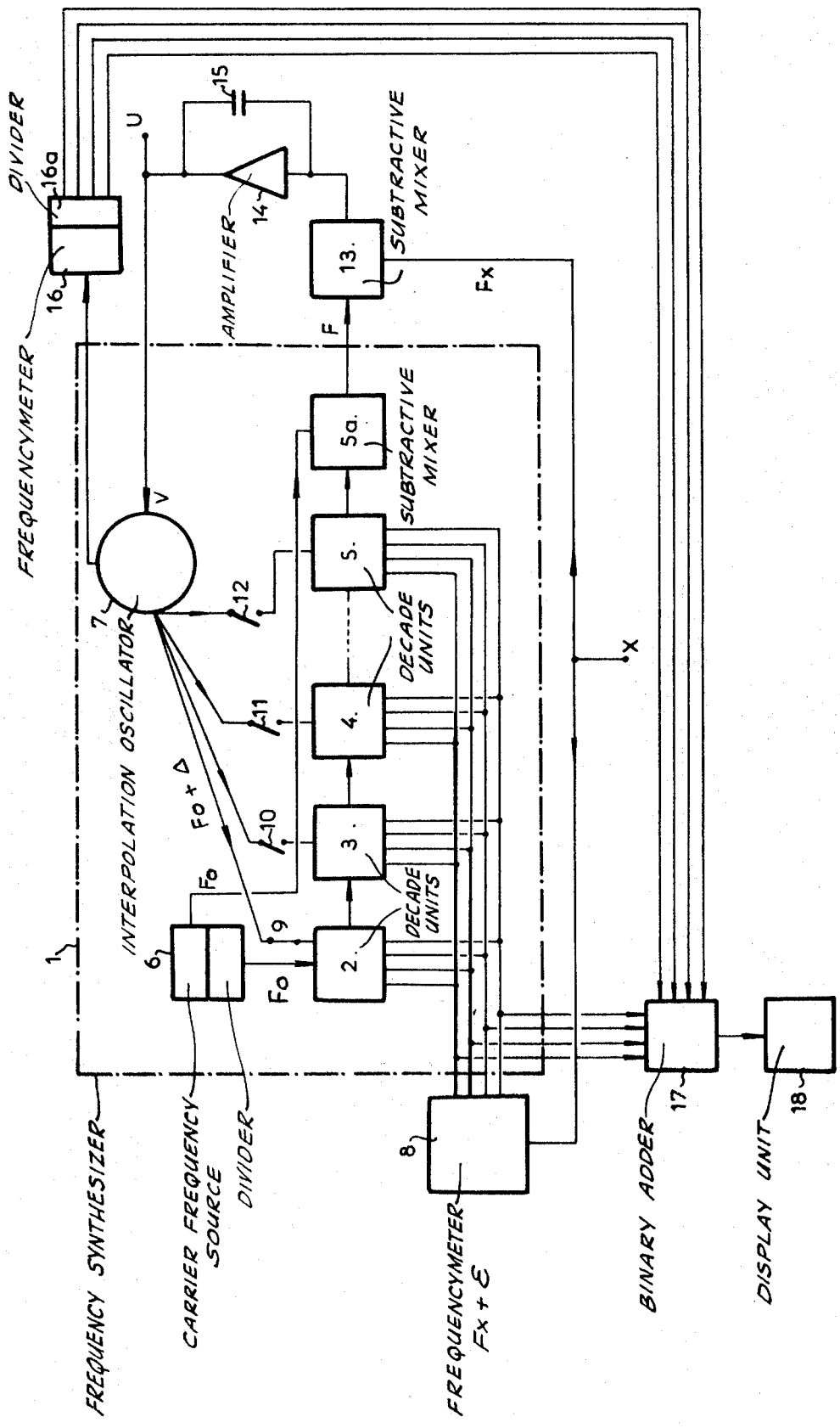

ACTIVE FREQUENCYMETER

The present invention relates to frequency meters.

The most usual methods for measuring a frequency include a quantification. For example, the number of alternations of the signal is counted during a standard time interval defined by the opening of a gate, or, if it concerns the measurement of very low frequencies, clock pulses are counted during one period. In both cases, an error of one step could occur and this limits the precision of the measurement. In the case of very low frequencies, the frequency must be calculated in taking the inverse of the measured period. Further, if the signal includes phase noise, the mean of the results obtained for a large number of periods must be calculated. This finally results in apparatuses equipped with very complex calculating means and in very long measuring times.

An object of the present invention is to avoid these drawbacks and to provide a frequency meter capable of operating with high precision and affording a rapid measurement in respect of both very low frequencies and very high frequencies.

According to the invention, the apparatus comprises a first conventional frequency meter having a memory of medium precision and digital outputs, an iterative frequency synthesizer programmed by said first frequencymeter, said synthesizer comprising an interpolation oscillator switchable to a plurality of the decade units of the synthetsizer, means for effecting a subtractive mixing of the synthesized frequency and the frequency to be measured, means for controlling the frequency variation of the interpolation oscillator from the output of the mixing means, and a second frequencymeter which has digital outputs and measures the frequency increment of the interpolation oscillator.

The interpolation oscillator is connected to one of those of the decade units of the synthesizer which would afford digits of the number which expresses the frequency to be measured, which are less significant than those furnished by the first frequencymeter. The frequency of this interpolation oscillator is finally controlled, through the loop constituted by the synthesizer and the mixing means, by a value which is such that the deviation between the synthesized frequency and the frequency to be measured is reduced to zero, so that it is sufficient to add the number measured by the second frequencymeter, taking into account its weight, to the number which expresses the synthesized frequency, to obtain the number which expresses the frequency to be measured.

It is the presence of a synthesizer in the apparatus which justifies the name "active frequency meter."

A better understanding of the invention will be had from the ensuing detailed description.

The single FIGURE of the accompanying drawing is a block diagram of an active frequency meter according to the invention.

In the figure, reference numeral 1 generally designates a conventional frequency synthesizer comprising a number of decade units such as 2, 3, 4, 5, a reference frequency source 6 and an interpolation oscillator 7. A synthesizer of this type is for instance disclosed in a leaflet entitled "Discover the MODEL 201 0–2 MHz Generator-Synthesizer," published by the assignee in June 1969.

As is known, if Fo is the carrier frequency which is applied to the first decade unit from source 6, the successive decade units normally furnish at their outputs frequencies respectively equal to $Fo + I_1$; $Fo + I_1/10 + I_2$; $Fo + I_1/100 + I_2/10 + I_3$, etc., $I_1$, $I_2$, $I_3$, etc., being the frequency increments applied to the successive decade units. These increments are, for example, $n$ times $10^3$Hz, $n$ varying from 0 to 9 and being applied to each decade unit in the form of an index value coded for example in the code 1 – 2 – 4 – 8.

After the output of the last decade unit 5, the carrier frequency Fo is eliminated by a subtractive mixer 5a which receives the frequency Fo from source 6. The output frequency of the synthesizer for four decade units is therefore $F = I_4 + I_3/10 + I_2/100 + I_1/1,000$. It varies from 0 to 9999 Hz per step of 1 Hz.

In the described apparatus, the index value of the synthesizer is furnished by a first frequency meter 8 to the input of which the frequency to be measured is applied. It will be supposed that the latter has a fixed principal term $Fx$ capable of being synthesized and a term $\epsilon$ which is capable of changing and whose evolution is required to be followed. The frequency meter 8 is of known type having medium precision digital outputs coded in 1 – 2 – 4 – 8 code and a memory. Consequently the most significant digits of the number which expresses the frequency to be measured, coded 1 – 2 – 4 – 8, are present, throughout the measuring time, at the outputs of the frequencymeter 8. It is arranged that they impose a value equal to $Fx$ on $F$.

Further, as is well known, there is normally in a synthesizer an interpolation oscillator whose frequency can vary in a continuous manner, as a function of a control voltage V. This oscillator can be applied to any one of the decade units by closing one of the switches 9–12. In the present case it will be applied to one of the decade units (2 or 3 for example) which affords digits which are less significant than those afforded by the frequencymeter 8. As well known, when the interpolation oscillator frequency is applied to one decade, this has for instance the effect of cancelling the coupling of the said decade with the preceding one and to substitute, for the output frequency of the said preceding decade, a frequency $Fo + \Delta$.

Thus, the interpolation oscillator adds to the increment ($I_2$ or $I_3$) a second positive or negative increment $\Delta$ having a maximum value equal to 10 times the step. If it is introduced, in the case shown in the figure, in the decade unit 2, the output frequency $F$ is increased by $\Delta/1,000$; if it is introduced in the decade unit 3, $F$ is increased by $\Delta/100$, and so on.

The output frequency $F$ of the synthesizer 1 is applied to a subtractive mixer 13 which also receives the frequency to be measured. The resultant beat frequency $Fx + \epsilon - F$ is applied — preferably through an integrator amplifier symbolically represented in the form of an amplifier 14 to the terminals of which is connected a capacitor 15 and which delivers the voltage V — to means controlling the frequency of the oscillator 7. It is for example a variable-capacity diode.

Consequently, the carrier frequency of the oscillator 7 (which is a relatively high frequency, for example $F_o = 15$ MHz) undergoes a variation $\Delta$. As this frequency acts on one of the decade units, for example decade 2, this decade will produce an increment $\Delta/1,000$ which modifies the output frequency of the synthesizer 1.

Thus the beat frequency is modified. So long as the frequency deviation exists the procedure continues and finally results in the complete elimination of this deviation. At this moment, the frequency of the oscillator 7 is equal to $F_o + \Delta_1$; the increment $\Delta_1$, which is positive or negative, can be measured by a second frequencymeter having a numerical output 16.

It is clear that the frequency to be measured $Fx + \epsilon$ is finally the sum of the frequency $Fx$ read off the frequency meter 8 and the quotient of the frequency read off the frequency-meter 16 divided by $n$, where $n$ is the ratio of division of the increment added by the interpolation oscillator 7 in the decade units which follow that in respect of which the switch is closed (in the considered example, $n = 1,000$). In practice, the frequencymeter 16 is followed by a divider 16a dividing by $n$ and the result is added to $Fx$ in a binary adder 17 followed by a discharge tube digit display device 18.

By measuring the control voltage V of the oscillator of which $\Delta_1$ is a linear function, there is obtained an analog reading of the value of the frequency deviation $\epsilon$ and, if desired, a graphic recording of this deviation can be made.

It should be mentioned that the resolution of the described device, for a given measuring time, is substantially multiplied by $n$. This error multiplication coefficient can be as much as $10^6$ or more by utilizing a synthesizer having a sufficient number of decade units. Thus it is possible, for example, to measure a frequency of 60 MHz to 1/1,000 Hz taken within a time of the order of a second. The choice of n and therefore of the resolution within the limits of the number of decade units, is made by the user, bearing in mind the following considerations: on one hand, n must be such that the increment $\Delta/n$, positive or negative, that the oscillator can undergo, taking into account the frequency range of the phase locking loop, be able to enable the synthesizer to generate $Fx + \epsilon_1$, $\epsilon_1$ being the maximum value (usually known) of the deviation $\epsilon$; on the other hand, the noise pertaining to phase of frequency of the source to be measured must not result in frequency deviations greater than $\Delta/n$.

Note that the apparatus can measure both low frequencies and high frequencies, by suitably choosing the synthesizer.

The amplifier 14 is not necessarily an integrator. However, the integration permits the measurement of the mean frequency with various possible integration time constants so as to eliminate as far as possible the high components of the noise of the phase on $Fx$ frequency.

The apparatus employs only a single source of frequency Fo of convenient value (for example 1 to 5 MHz) which is quartz stabilized.

When the deviation $\epsilon$ has reached a relatively high value, it is easy to reset the apparatus to zero by effecting a new measurement of $Fx$ by means of the frequency meter 8.

It will be understood that various modifications may be made to the system described and illustrated without departing from the scope of the invention.

I claim:

1. A device for measuring frequencies, comprising a first frequencymeter having a memory and digital outputs, an iterative frequency synthesizer programmed by the first frequency-meter, said synthesizer comprising a plurality of decade units, an interpolation oscillator and switching means for switching said interpolation oscillator to a plurality of the said decade units, mixing means for effecting a subtractive mixing of the synthesized frequency and the frequency to be measured, said mixing means having an output, control means connected to the said output of the mixing means for controlling the frequency variation of the interpolation oscillator, and a second frequencymeter which has digital outputs and connected to the interpolation oscillator for measuring the frequency increment thereof.

2. A device for measuring frequencies as claimed in claim 1, further comprising means for totalizing the frequency measured by the first frequencymeter and the frequency measured by the second frequencymeter given a weight which depends on the position of the said switching means.

3. A device for measuring frequencies as claimed in claim 1, wherein said mixing means is connected to the said control means, through an integrator amplifier.

4. A device for measuring frequencies as claimed in claim 3, comprising means for measuring the output voltage of said integrator amplifier.

* * * * *